(12) United States Patent
Tu et al.

(10) Patent No.: US 10,146,374 B2
(45) Date of Patent: Dec. 4, 2018

(54) ARRAY SUBSTRATE, DISPLAY PANEL AND DRIVING DEVICE

(71) Applicant: XIAMEN TIANMA MICRO-ELECTRONICS CO., LTD., Xiamen (CN)

(72) Inventors: Jun Tu, Xiamen (CN); Kangpeng Yang, Xiamen (CN); Weipeng Wang, Xiamen (CN); Yumin Xu, Xiamen (CN); Chao Zheng, Xiamen (CN)

(73) Assignee: XIAMEN TIANMA MICRO-ELECTRONICS CO., LTD., Xiamen (CN)

( * ) Notice: Subject to any disclaimer, the term of this patent is extended or adjusted under 35 U.S.C. 154(b) by 0 days.

(21) Appl. No.: 15/888,083

(22) Filed: Feb. 5, 2018

(65) Prior Publication Data

US 2018/0157373 A1   Jun. 7, 2018

(30) Foreign Application Priority Data

Oct. 31, 2017   (CN) .......................... 2017 1 1050923

(51) Int. Cl.
*G06F 3/041* (2006.01)
*G09G 3/20* (2006.01)

(52) U.S. Cl.
CPC .......... *G06F 3/0418* (2013.01); *G06F 3/0412* (2013.01); *G09G 3/20* (2013.01); *G09G 3/2092* (2013.01); *G06F 2203/04105* (2013.01); *G09G 2310/0205* (2013.01); *G09G 2310/0267* (2013.01); *G09G 2310/0281* (2013.01); *G09G 2310/0286* (2013.01); *G09G 2310/08* (2013.01); *G09G 2354/00* (2013.01)

(58) Field of Classification Search
None
See application file for complete search history.

(56) References Cited

U.S. PATENT DOCUMENTS

2018/0130543 A1*   5/2018   Zhu .................... G11C 19/28

* cited by examiner

*Primary Examiner* — Christopher J Kohlman
(74) *Attorney, Agent, or Firm* — Kilpatrick Townsend & Stockton LLP

(57) ABSTRACT

Provided are an array substrate, a display panel and a driving device. In the array substrate, a pressure sensor is disposed between adjacent two of the shift registers at either of the two sides of the display region; the scanning lines include a first set of scanning lines and a second set of scanning lines; the extending lines of the first set of scanning lines pass the pressure sensors in the first region, and the first set of scanning lines are electrically connected to the corresponding shift registers in the second region.

10 Claims, 14 Drawing Sheets

US 10,146,374 B2

ARRAY SUBSTRATE, DISPLAY PANEL AND DRIVING DEVICE

CROSS-REFERENCE TO RELATED APPLICATIONS

This application claims priority to Chinese patent application No. 201711050923.8 filed on Dec. 29, 2016, the disclosure of which is incorporated herein by reference in its entirety.

TECHNICAL FIELD

The present disclosure relates to touch pressure detecting technologies, and in particular relates to an array substrate, a display panel and a driving device.

BACKGROUND

At present, the display panel integrated with a touch electrode is widely applied in various electronic devices, e.g. mobile phones, tablet computers and kiosks in the public place. As such, the user may perform the operations on the electronic devices by merely touching the icons in the electronic devices using his finger, so that the user does not need other input devices (e.g. keyboards and mice), thereby making a human-machine interaction easier.

In one embodiment, a pressure sensor is commonly integrated into the display panel to detect the magnitude of the touch pressure when the users touching the display panel, thereby improving the applied range of touch technologies. However, at present, the display panel includes a display region and a non-display region surrounding the display region. And the pressure sensor is commonly disposed between two adjacent shift registers of the non-display region of the display panel. Due to excessive large size of the pressure sensor, the position of the shift registers needs to be adjusted, and the distance between the edge of the shift register close to the display region and the boundary between the display region and non-display region needs to be widen, which enables the signal outputting terminal of each shift register to be electrically connected to the corresponding scanning lines of the display region. Undoubtedly, the increased distance between the edge of the shift register close to the display region and the boundary between the display region and non-display region would increase the area of the non-display region of the display panel, which is not favorable to the developing trends of narrow-frame design.

SUMMARY

The present disclosure provides an array substrate, a display panel and a device, thereby decreasing the area of the non-display region of the display panel, which is favorable to developing trends of narrow frame.

In a first aspect, the present disclosure proves an array substrate, and the array substrate includes:

a base substrate, the base substrate includes a display region and a non-display region surrounding the display region, and the non-display region includes a first region located at a first side of the display region and a second region located at a second side of the display region, and the first side is opposite to the second side;

a plurality of shift registers successively disposed in the first region and the second region along a first direction, and stages of shift registers from the plurality of shift registers disposed at each of the first region and the second region of the display region are successively cascaded with each other;

a plurality of scanning lines disposed in the display region of the base substrate, and each of the plurality of shift registers is electrically connected to a respective one of the plurality of scanning lines to output a scanning signal, and the first direction is intersected with the plurality of scanning lines;

a plurality of pressure sensors disposed in the first region and the second region of the base substrate, one of the plurality of pressure sensors is disposed between adjacent two of the shift registers at either of the first side and the second side of the display region; and a controller, which is electrically connected to each of the plurality of shift registers, and the controller is configured to control the shift registers to input the scanning signals to the scanning lines electrically connected with to the shift registers according to an arrangement sequence of the scanning lines in an image displaying stage.

In a second aspect, the present disclosure provides a display panel, the display panel includes one of the array substrates provided by the present disclosure.

In a third aspect, the present disclosure provides a driving device.

The driving device includes:

in an image displaying stage, each of the shift registers is to be controlled to input the scanning signals to the scanning lines electrically connected with the shift registers according to an arrangement sequence of the scanning lines; and the scanning signals transmitted in the first set of scanning lines are provided by the shift registers in the second region corresponding to the first set of scanning lines; and the scanning signals transmitted in the second set of scanning lines are provided by the shift registers in the first region corresponding to the second set of scanning lines.

In the present disclosure, the scanning lines for which the pressure sensors disposed in the first region are located on extending lines thereof are different from the scanning lines for which the pressure sensors disposed in the second region are located on extending lines thereof. The scanning lines include a first set of scanning lines and a second set of scanning lines. The extending lines of the first set of scanning lines pass the pressure sensors in the first region, and the first set of scanning lines are electrically connected to the corresponding shift registers in the second region. The extending lines of the second set of scanning lines pass the pressure sensors in the second region and the second set of scanning lines are electrically connected to the corresponding shift registers in the first region. It solves the problem that, to arrange the pressure sensors, the distance between the edge of the shift register close to the display region and the boundary between the display region and non-display region need to be increased in the display panel so that the area of the non-display region of the display panel is increased. In the embodiments, the area of the non-display region in the display panel is reduced, which is favorable to the developing trends of narrow frame.

DETAILED DESCRIPTION

Figure 1:
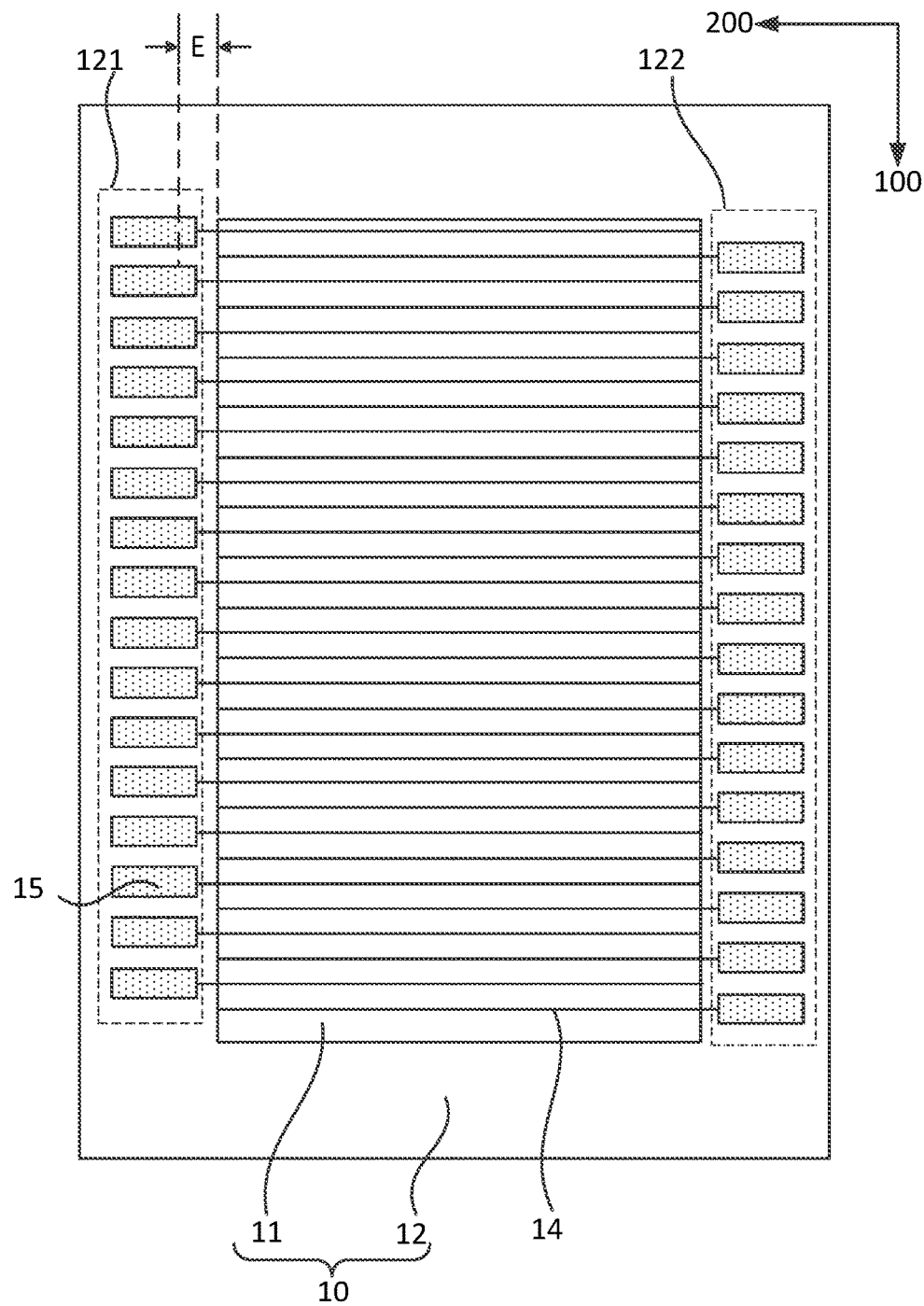
FIG. 1 is a structural diagram showing an array substrate in the related art.

The present disclosure is further described below in combination with the drawings and embodiments. It should be understood that, the embodiments described herein are merely used to explain the present disclosure rather than limiting the present disclosure. In addition, it should be stated that in order to facilitate the description, merely a part of structures related to the present disclosure rather than the whole structure are illustrated in the drawings.

FIG. 1 is a structural diagram showing an array substrate in the related art. No pressure sensor is disposed in the array substrate. Referring to FIG. 1, the array substrate includes a base substrate 10. The base substrate 10 includes a display region 11 and a non-display region 12 surrounding the display region 11, and a first direction 100 and a second direction 200 are both parallel to the base substrate 10, and the first direction 100 and the second direction 200 are intersected with each other.

Still referring to FIG. 1, the display region 11 of the base substrate 10 includes a plurality of scanning lines 14 extending along the second direction 200 and a plurality of data lines extending along the first direction 100 (not shown in FIG. 1). A plurality of pixel units are disposed in regions formed by crossing the scanning lines 14 with the data lines (not shown in FIG. 1). The non-display region 12 of the base substrate 10 further includes a plurality of shift registers 15 successively disposed along the first direction 15. The shift register 15 includes a signal outputting terminal (not shown in FIG. 1). The signal outputting terminal of the shift register 15 is electrically connected to at least one of the scanning lines 14 and provides a scanning signal to the corresponding scanning line 14, thereby controlling the working state of the pixel unit electrically connected with the scanning line 14 so as to perform image display. Along the first direction 100, odd-numbered scanning lines 14 are electrically connected to the corresponding shifter registers 15 disposed in the first region 121, respectively, and the even-numbered scanning lines 14 are electrically connected to the corresponding shifter registers 15 disposed in the second region 122, respectively.

Figure 2:
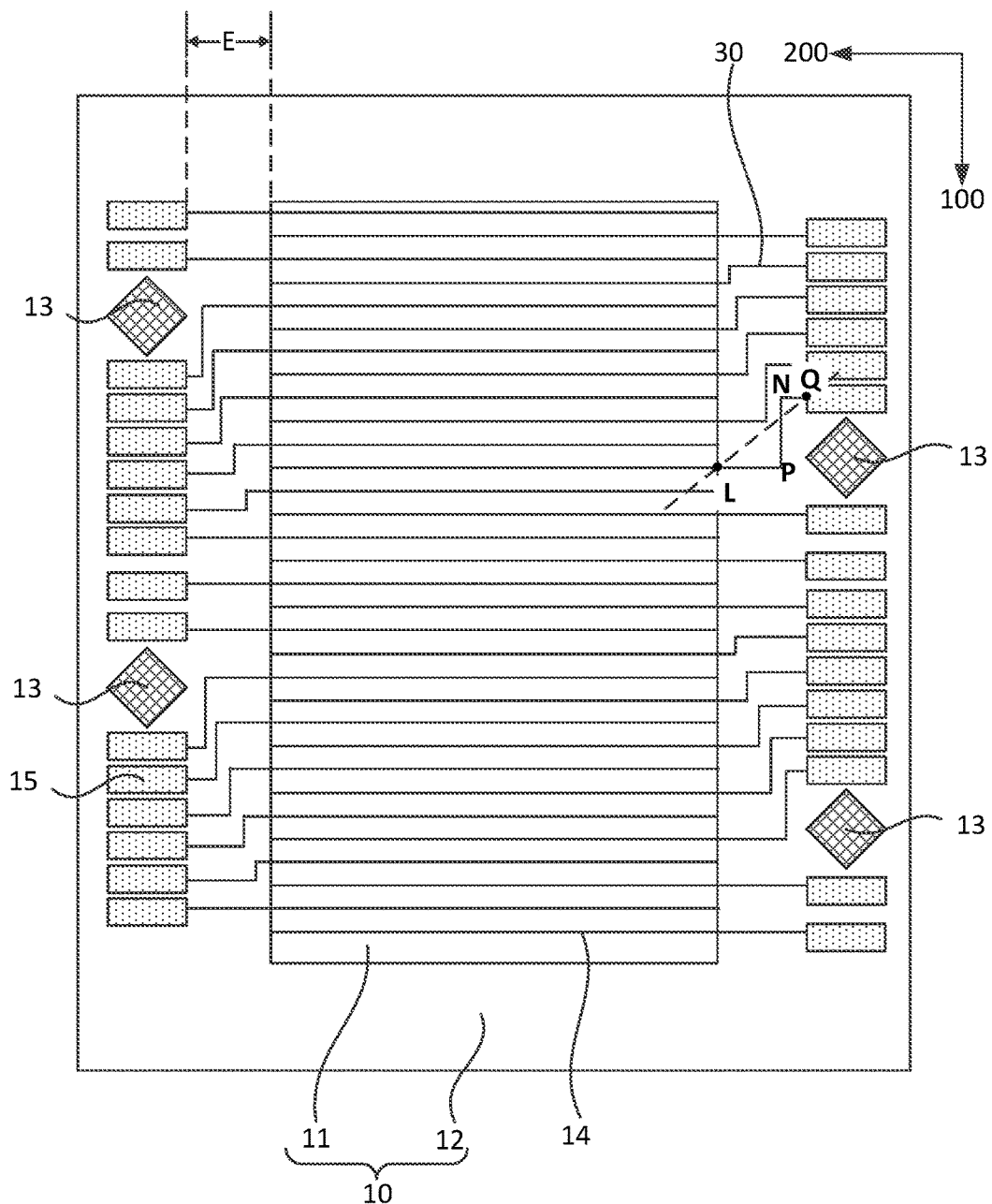
FIG. 2 is a structural diagram showing another array substrate in the related art.

FIG. 2 is a structural diagram showing another array substrate in the related art. Comparing with FIG. 1, in FIG. 2, a plurality of pressure sensors are disposed in the array substrate. Specifically, referring to FIG. 2, the pressure sensor 13 is disposed between adjacent two of the shift registers 15 in the non-display region 12 of the base substrate 10.

Comparing FIG. 1 with FIG. 2, since the size of pressure sensor 13 is excessively large, the position of the shift register 15 needs to be adjusted so as to release a large region to dispose the pressure sensor 13. After adjusting the position of the shift register 15, the signal outputting terminal of the shift register 15 is misaligned with the corresponding scanning line 14 in the row direction. The term "misalign" refers to that one end L of the scanning line 14 (that is an intersection point L of the boundary between the display region 11 and the non-display region 12 with the scanning line 14) is connected with a signal outputting terminal Q of corresponding shift register 15 to form a line LQ, and such the line LQ is not parallel to the extending direction (namely the second direction 200) of the scanning line 14. Thus, the end L of the scanning line 14 has to be connected with the signal outputting terminal Q of the shift register 15 via a bended connecting wire 30.

In one embodiment, to simplify the manufacturing process of the array substrate and reduce the thickness of the array substrate, the scanning lines 14 and the connecting wires 30 are disposed at one layer and manufactured in one process in an array substrate. As such, in a practical design, some factors such as the width of each of the connecting wires 30, the distance between each of the connecting wires 30 etc., should be fully considered so as to avoid possibly short circuits and cracks of the connecting wires 30. Apparently, to enable each of the connecting wires 30 to transmit a signal, a distance E between the edge of the shift register 15 close to the display region 11 and the boundary between the display region 11 and non-display region 12 has to be increased, thereby separating the connecting wires 30 from each other by an enough space. Apparently, the more number of misalignments between signal outputting terminals of the shift registers 15 and the corresponding scanning lines 14 in the row direction would cause the larger distance E between the edge of the shift registers 15 close to the display region 11 and the boundary between the display region 11 and non-display region 12, so that the area of the non-display region 12 of the display panel is increased, which is not favorable to the developing trends of the narrow frame.

Further, the pressure sensor 13 commonly includes an induction signal measuring terminal (not shown), and the induction signal measuring terminal (not shown) is electrically connected to a signal outputting wire to output a pressure detection signal from the pressure sensor 13. The signal outputting wire is extended along the first direction 100. It is known from researches that, the larger the area of the overlapped region between the vertical projection of the connecting wire 30 on the base substrate 10 and the vertical projection of the signal outputting wire on the base substrate 10 is, the larger the intensity of the noise of the pressure sensor 13 is, and the lower the detection accuracy of the pressure sensor 13 is.

Still referring to FIG. 2, the connecting wires 30 disposed around the pressure sensor 13 include a line segment NP parallel to the first direction 100, so that in the practical design, the line segment NP needs not to be overlapped with the signal outputting wire of each of the pressure sensors 13, which may make difficult in the arrangement of the pressure sensors.

Figure 3:
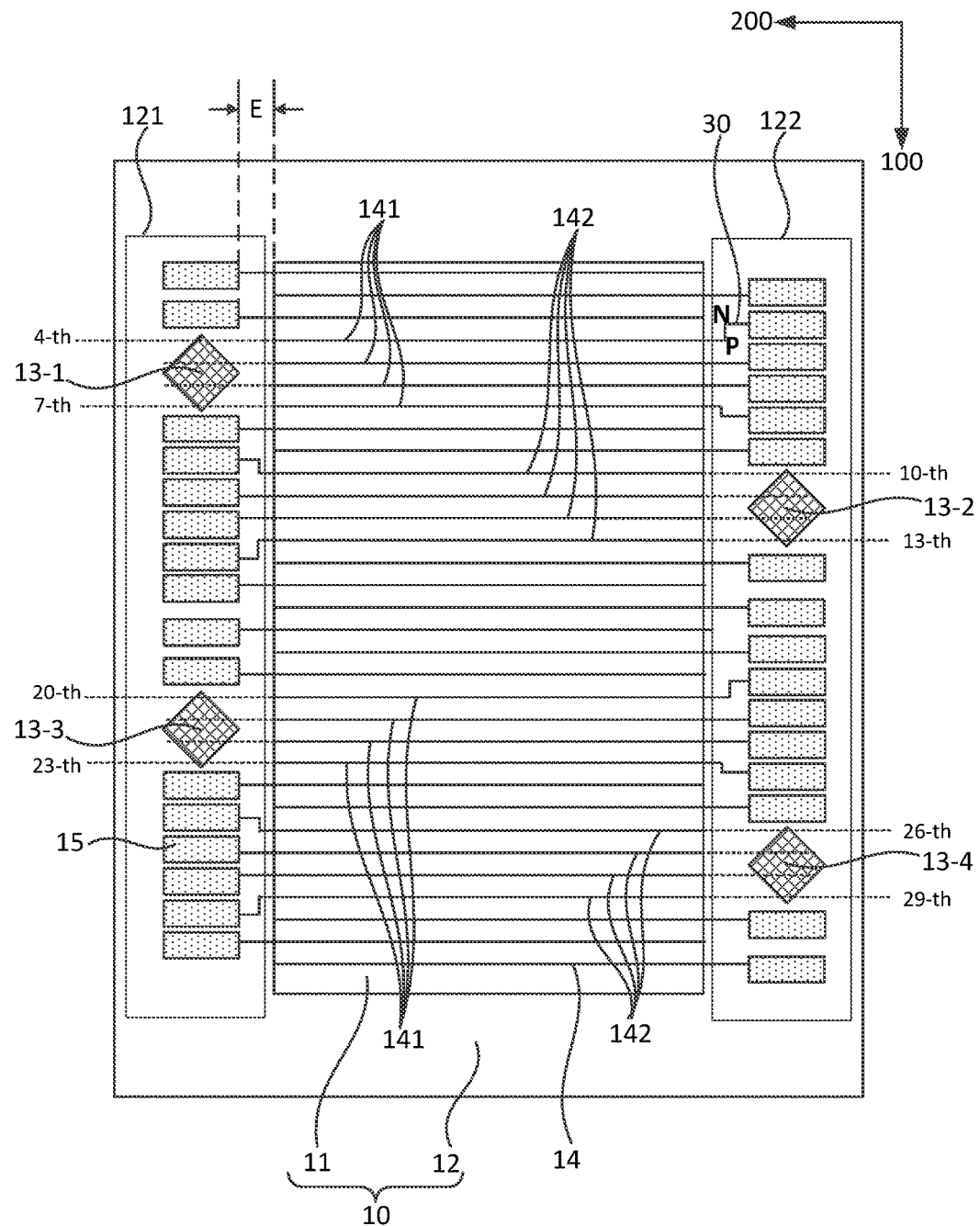
FIG. 3 is a structural diagram showing an array substrate according to an embodiment of the present invention.

FIG. 3 is a structural diagram showing an array substrate according to an embodiment of the present invention. Referring to FIG. 3, the array substrate includes: a base substrate 10, and the base substrate includes a display region 11 and a non-display region 12 surrounding the display region 11. The non-display region 12 includes a first region 121 located at a first side of the display region 11 and a second region 122 located at a second side of the display region 11, and the first side is opposite to the second side. The array substrate further includes a plurality of shift registers 15 successively disposed in the first region 121 and the second region 122 of the base substrate 10 along a first direction, and the stages of shift registers 15 from the plurality of shift registers 15, which are disposed at each of the first side and the second side of the display region 11, are successively cascaded with each other. The array substrate further includes a plurality of scanning lines 14 disposed in the display region 11 of the base substrate 10; each of the plurality of shift registers 15 is electrically connected to a respective one of the plurality of scanning lines 14 to output a scanning signal; and the first direction 100 is intersected with the plurality of scanning lines 14. The array substrate further includes a plurality of pressure sensors disposed in the first region 121 and the second region 122 of the base substrate 10, and one of the plurality of pressure sensors is disposed between adjacent two of the shift registers 15 at either of the first side and the second side of the display region 11. The scanning lines 14 include a first set of scanning lines 141 and a second set of scanning lines 142, and the extending lines of the first set of scanning lines 141 pass the pressure sensors in the first region 121, and the first set of scanning lines 141 are electrically connected to the corresponding shift registers 15 in the second region 122. The extending lines of the second set of scanning lines 142 pass the pressure sensors in the second region 122, and the second set of scanning lines are electrically connected to the corresponding shift registers 15 in the first region 121. A controller (not shown) is electrically connected to each of the plurality of shift registers 15, the controller is configured to control the shift registers 15 to input the scanning signals to the scanning lines 14 electrically connected with the shift registers 15 according to an arrangement sequence of the scanning lines 14 in an image display stage.

Specifically, still referring to FIG. 3, and four pressure sensors are exemplarily shown in FIG. 3, and the four pressure sensors are a pressure sensor 13-1, a pressure sensor 13-2, a pressure sensor 13-3 and a pressure sensor 13-4. The pressure sensor 13-1 and the pressure sensor 13-3 are disposed in the first region 121, and the pressure sensor 13-2 and the pressure sensor 13-4 are disposed in the second region 122.

The arrangement sequence number of a scanning line 14 along the first direction 100 acts as the line number of the scanning line 14. In this way, the extending lines of the 4-th scanning line 14 to the 7-th scanning line 14 pass the pressure sensor 13-1 in the first region 121, and the scanning lines of the 4-th scanning line 14 to the 7-th scanning line 14 are included in the first set of scanning lines 141. The extending lines of the tenth scanning line 14 to the 13-th scanning line 14 pass the pressure sensor 13-2 in the second region 122, and the scanning lines of the 10-th scanning line 14 to the 13-th scanning line 14 are included in the second set of scanning lines 142. The extending lines of the 20-th scanning line 14 to the 23-th scanning line 14 pass the pressure sensor 13-3 in the first region 121, and the scanning lines of the 20-th scanning line 14 to the 23-th scanning line 14 are included in the first set of scanning lines 141. The extending lines of the 26-th scanning line 14 to the 29-th scanning line 14 pass the pressure sensor 13-4 in the second region 122, and the scanning lines of the 26-th scanning line 14 to the 29-th scanning line 14 are included in the second set of scanning lines 142. The first set of scanning lines 141 (including the scanning lines of the 20-th scanning line 14 to the 23-th scanning line 14, the 20-th scanning line 14 to the 23-th scanning line 14) are electrically connected to the corresponding shift registers 15 in the second region 122; and the second set of scanning lines 142 (including the scanning lines of the 10-th scanning line 14 to the 13-th scanning line 14, the 26-th scanning line 14 to the 29-th scanning line 14) are electrically connected to the corresponding shift registers 15 in the first region 121.

In this embodiment, the scanning lines for which the pressure sensors disposed in the first region are located on extending lines thereof are different from the scanning lines for which the pressure sensors disposed in the second region are located on extending lines thereof. The scanning lines include a first set of scanning lines and a second set of scanning lines. The extending lines of the first set of scanning lines pass the pressure sensors in the first region, and the first set of scanning lines are electrically connected to the corresponding shift registers in the second region. The extending lines of the second set of scanning lines pass the pressure sensors in the second region, and the second set of scanning lines are electrically connected to the corresponding shift registers in the first region. In this arrangement, the corresponding relation between the first set of scanning lines and the second set of scanning lines and shift registers 15 is adjusted, so that the probability of misalignment between the signal outputting terminal of the shift register 15 and the corresponding scanning line 14 in the row direction is decreased, thereby decreasing the distance E between the edge of the shift register 15 close to the display region 11 and the boundary between the display region 11 and non-display region 12. Hence, it solve the problem that, to arrange the pressure sensor, the distance E between the edge of the shift register 15 close to the display region 11 and the boundary between the display region 11 and non-display region 12 needs be increased in the display panel, which enables the area of the non-display region 12 of the display panel to be increased. In this embodiment, the area of the non-display region in the display panel is reduced, which is favorable to the developing trends of the narrow frame.

Further, still referring to FIG. 3, since the probability of misalignment between the signal outputting terminal of the shift register 15 and the corresponding scanning line 14 in the row direction is decreased, a length of the line segment NP of the connecting wire 30 parallel to the first direction 100 is decreased, so that in the practical design, the complexity in the arrangement of the pressure sensors and the noise intensity of the pressure sensor 13 are reduced, and the detection accuracy of the pressure sensor 13 is improved.

Figure 4:
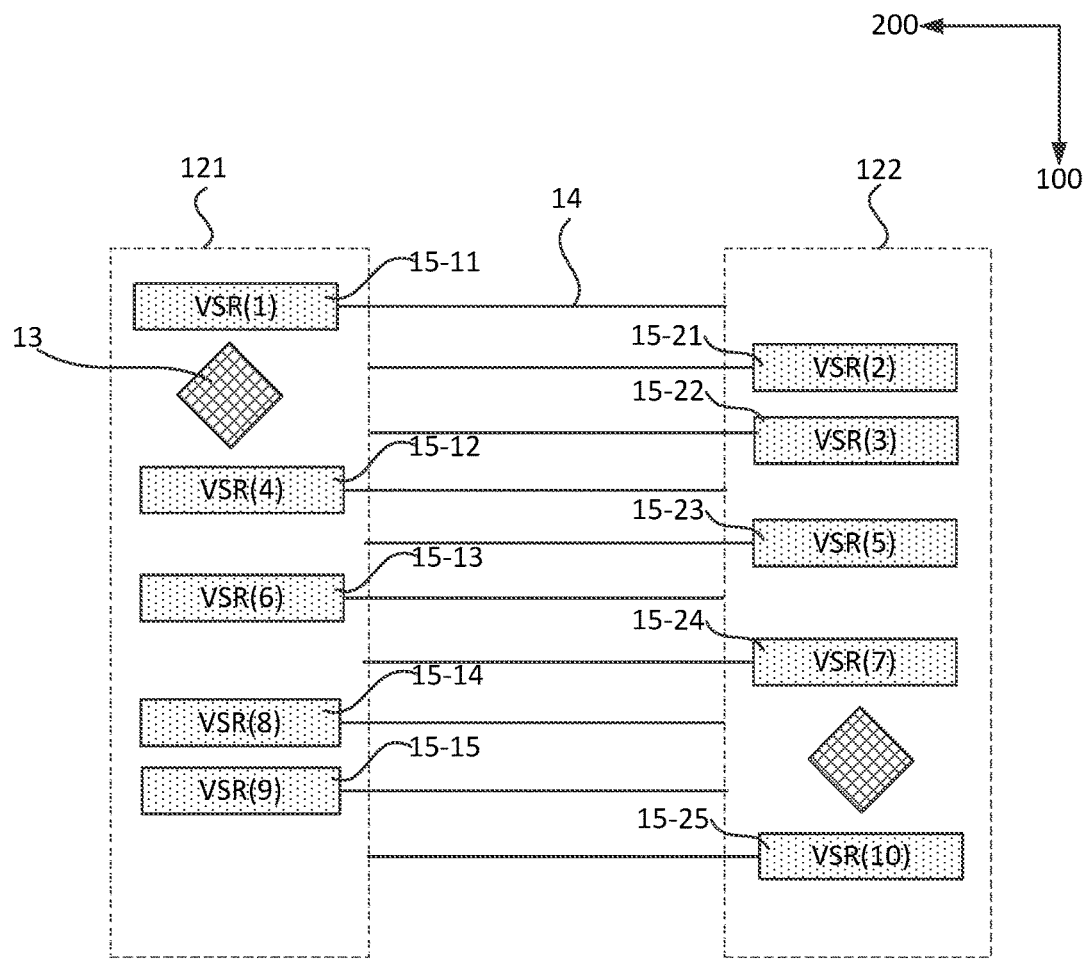
FIG. 4 is a structural diagram showing another array substrate according to an embodiment of the present invention.
Figure 5:
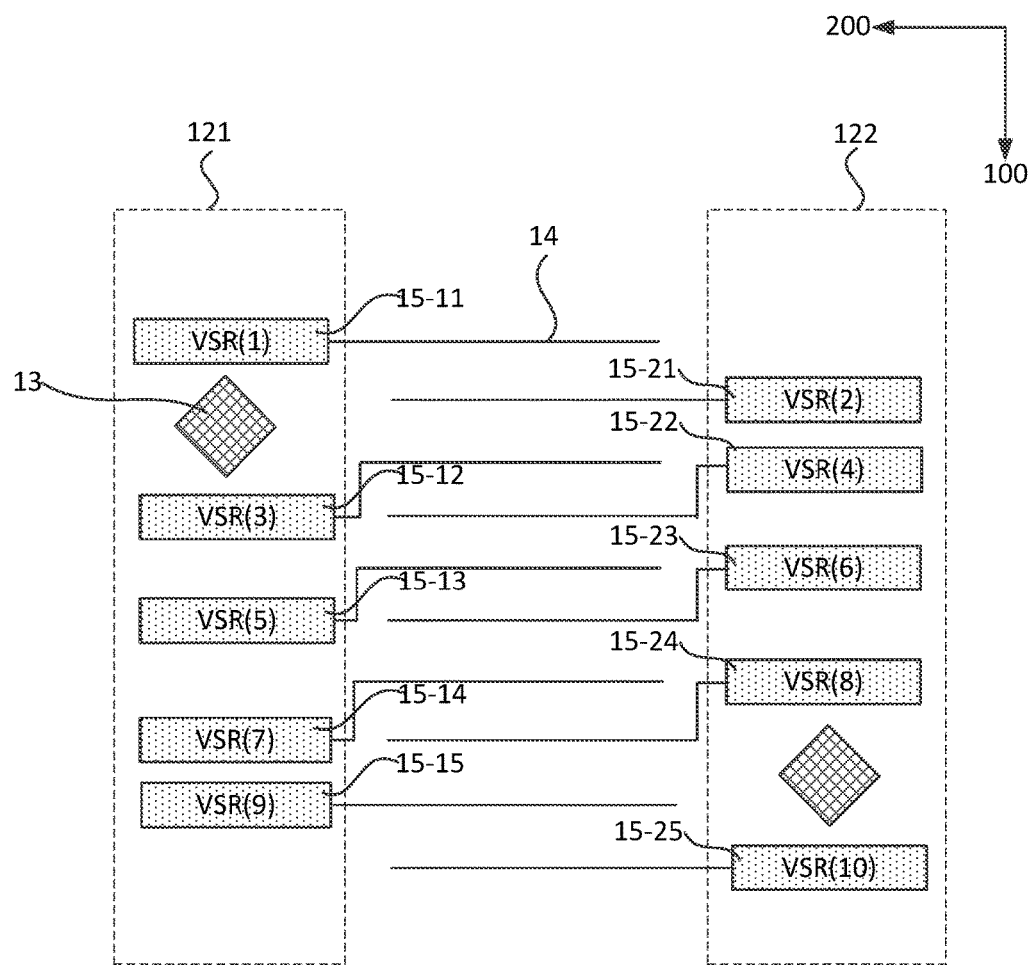
FIG. 5 is a structural diagram showing another array substrate in the related art.

FIG. 4 is a structural diagram showing another array substrate according to an embodiment of the present invention, and FIG. 5 is a structural diagram showing another array substrate in the related art. The shift registers of the display panels provided in FIG. 4 and FIG. 5 have same setting positions, but the corresponding relations between the scanning lines and the shift registers are different. Specifically, the array substrates provided in FIG. 4 and FIG. 5 exemplarily include ten shift registers, i.e., a shift register 15-11, a shift register 15-12, a shift register 15-13, a shift register 15-14, a shift register 15-15, a shift register 15-21, a shift register 15-22, a shift register 15-23, a shift register 15-24 and a shift register 15-25. In FIG. 4, each of the shift registers is successively electrically connected to one of the scanning lines 14 according to the corresponding relations between the scanning lines and the shift registers provided by the present disclosure. In FIG. 5, each of the shift registers is successively electrically connected to one of the scanning lines 14 according to the corresponding relations between the scanning lines and the shift registers in a prior art.

The arrangement sequence number of each of the stages of shift registers is determined by the line number of the scanning line 14 electrically connected to the each stage of shift register, so that for a shift register, the stage number of the stage of the shift register in FIG. 4 is different from that in FIG. 5. For example, in FIG. 4, the third stage of the shift register VSR3 is defined as the shift register 15-22 disposed in the second region 122, but in FIG. 5, the fourth stage of the shift register VSR4 is defined as the shift register 15-22 disposed in the second region 122.

For the array substrate provided in FIG. 4, for the arrangement that in an image displaying stage, the controller is configured to control the shift registers 15 to input the scanning signals to the scanning lines 14 electrically connected with the shift registers 15 according to an arrangement sequence of the scanning lines 14, specifically, in the image displaying stage, the scanning signals are successively inputted to the scanning lines 14 electrically connected with the shift registers according to a sequence of: the shift register 15-11 (namely the first stage of the shift register VSR1), the shift register 15-21 (namely the second stage of the shift register VSR2), the shift register 15-22 (namely the third stage of the shift register VSR3), the shift register 15-12 (namely the fourth stage of the shift register VSR4), the shift register 15-23 (namely the fifth stage of the shift register VSRS), the shift register 15-13 (namely the sixth stage of the shift register VSR6),the shift register 15-24 (namely the seventh stage of the shift register VSR7), the shift register 15-14 (namely the eighth stage of the shift register VSR8), the shift register 15-15 (namely the ninth stage of the shift register VSR9) and the shift register 15-25 (namely the tenth stage of the shift register VSR10).

For the array substrate provided in FIG. 5, for the arrangement that in an image displaying stage, the controller is configured to control the shift registers 15 to input the scanning signals to the scanning lines 14 electrically connected with the shift registers 15 according to an arrangement sequence of the scanning lines 14, specifically, in the image displaying stage, the scanning signals are successively inputted to the scanning lines 14 electrically connected with the shift registers according to a sequence of: the shift register 15-11 (namely the first stage of the shift register VSR1), the shift register 15-21 (namely the second stage of the shift register VSR2), the shift register 15-12 (namely the third stage of the shift register VSR3), the shift register 15-22 (namely the fourth stage of the shift register VSR4), the shift register 15-13 (namely the fifth stage of the shift register VSRS), the shift register 15-23 (namely the sixth stage of the shift register VSR6), the shift register 15-14 (namely the seventh stage of the shift register VSR7), the shift register 15-24 (namely the eighth stage of the shift register VSR8),the shift register 15-15 (namely the ninth stage of the shift register VSR9) and the shift register 15-25 (namely the tenth stage of the shift register VSR10).

Therefore, comparing with the display panel in the prior art, the scanning signals are the successively inputted to the scanning lines by only adjusting working orders of the shift registers according to this embodiment, and hence the normal charging order of pixel units may be achieved.

In summary, in this embodiment, the pixel units can be charged in a normal order, and also, the probability of misalignment between the signal outputting terminal of the shift register and the corresponding scanning line in the row direction is decreased, thereby decreasing the area of the non-display region of the display panel, reducing the complexity in the arrangement of the pressure sensors and the noise intensity of the pressure sensors, and increasing the detection accuracy of the pressure sensor.

Figure 6:
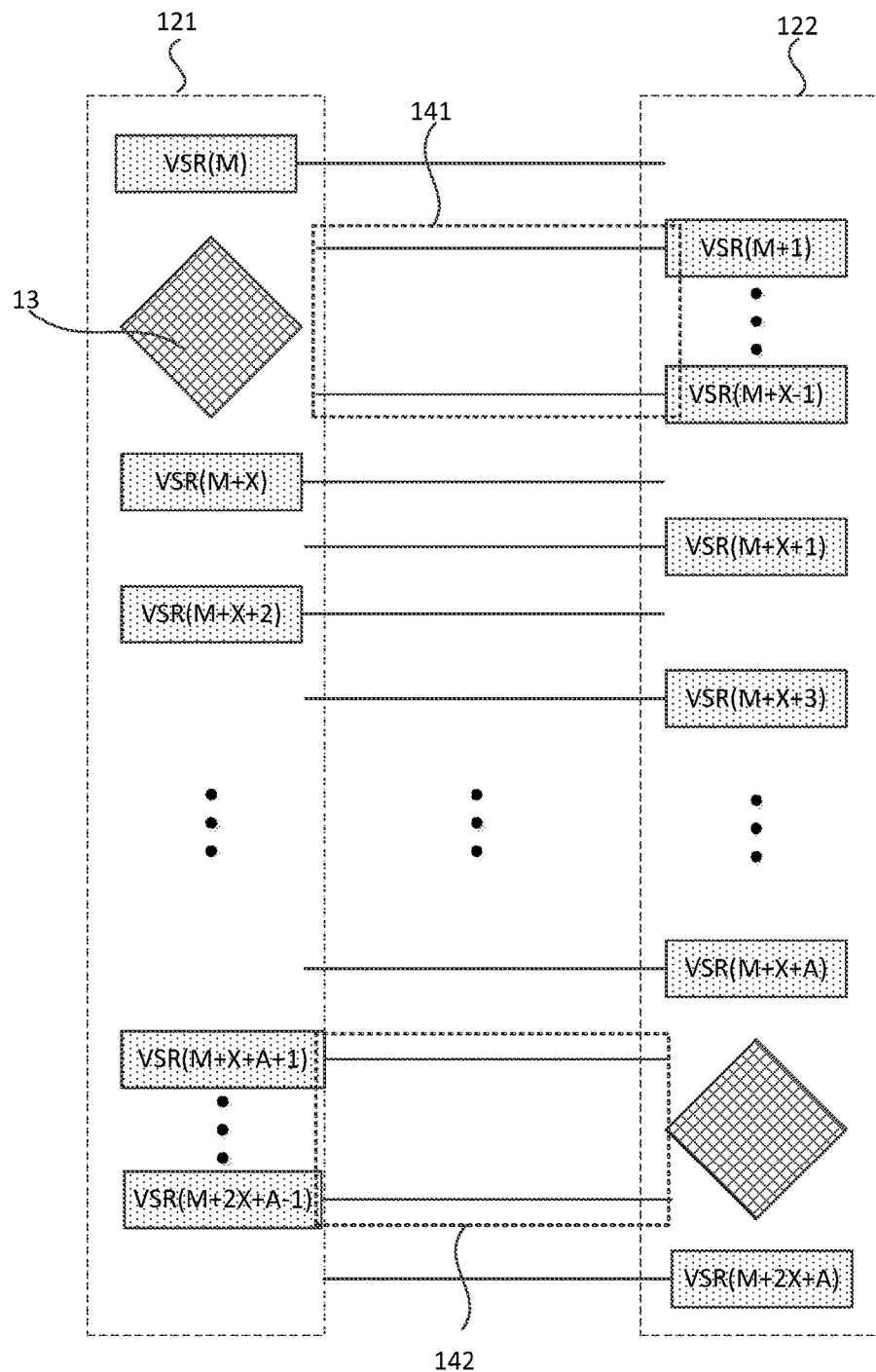
FIG. 6 is a structural diagram showing another array substrate according to an embodiment of the present invention.

FIG. 6 is a structural diagram showing another array substrate according to an embodiment of the present invention. Referring to FIG. 6, for this array substrate, the stage number of each of the stages of shift registers is same with the line number of the scanning line 14 electrically connected to the each stage of the shift register; and the two shift registers adjacent with the one of the pressure sensors 13 in the first region 121 are a M-th stage of shift register VSR (M) and a M+X-th stage of shift register VSR (M+X), respectively, and the number of the first set of scanning lines 14 corresponding to the one of the pressure sensors 13 is X−1. The two shift registers adjacent with the one of the pressure sensors 13 in the second region 122 are a M+X+A-th stage of shift register VSR (M+X+A) and a M+2X+A-th stage of shift register VSR (M+2X+A), and the number of the second-type scanning lines 142 corresponding to the one of the pressure sensors 13 is X−1. X is a positive integer not less than two, and M and A are a positive integer not less than one. In this embodiment, the pixel units can be charged in a normal order, and also, the probability of misalignment between the signal outputting terminal of the shift register and the corresponding scanning line 14 in the row direction is decreased, thereby decreasing the area of the non-display region of the display panel, and reducing the complexity in the arrangement of the pressure sensors 13 and the noise intensity of the pressure sensors 13, and increasing the detection accuracy of the pressure sensor 13.

It should be noted that, in the practical design, the larger the vertical projection of the pressure sensor 13 on the base substrate is, the more the amount of the corresponding first set of scanning lines 141 or second set of scanning lines 142 electrically connected to one pressure sensor 13 would be.

In the practical design, the arrangement that in an image displaying stage, each of the shift registers is controlled to input scanning signals to the scanning lines electrically connected with each of the shift registers according to an arrangement sequence of the scanning lines may have various implementations. Exemplary embodiments are given in detailed as follows, but are not intended to limit the present disclosure.

Figure 7:
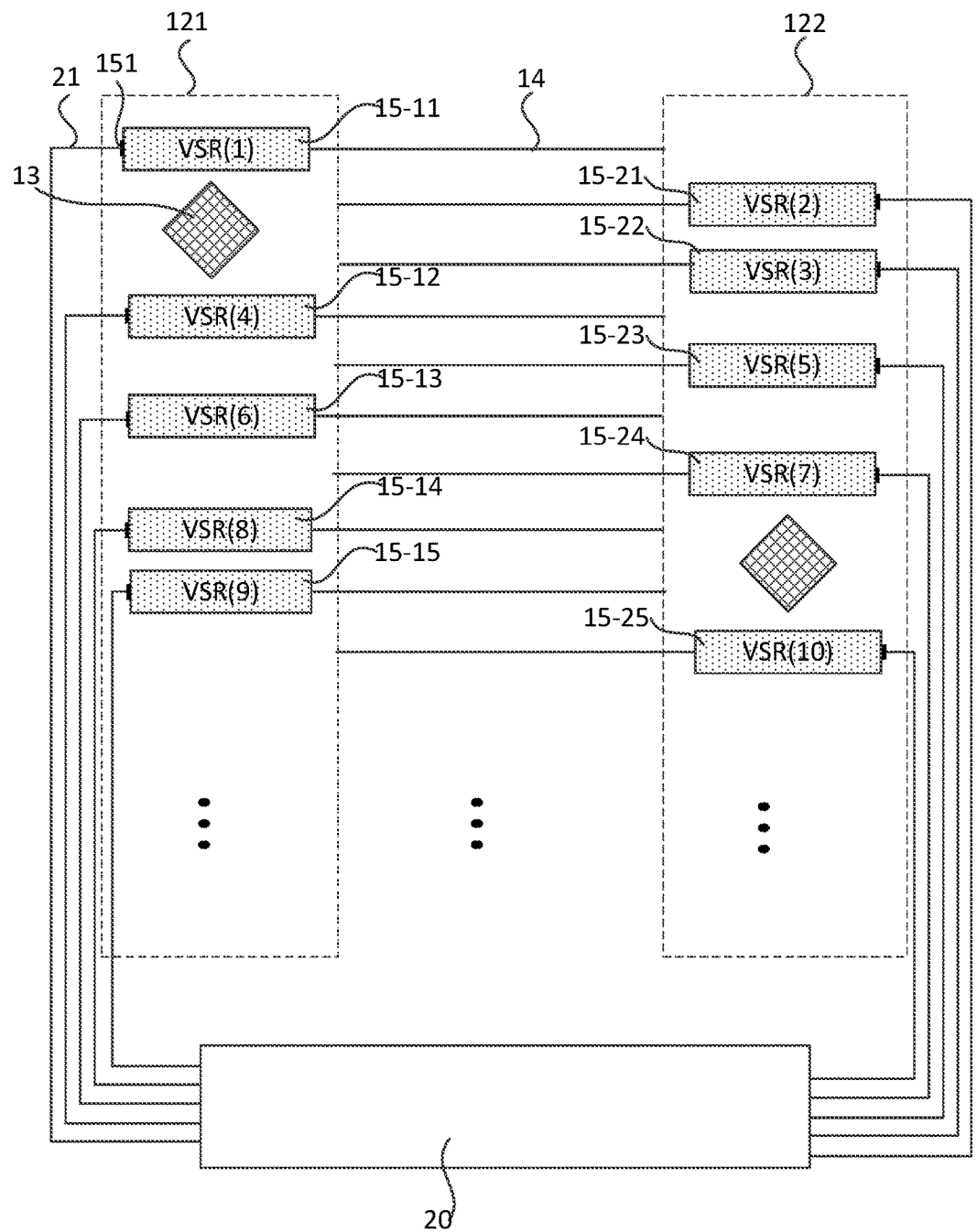
FIG. 7 is a structural diagram showing another array substrate according to an embodiment of the present invention.

FIG. 7 is a structural diagram showing another array substrate according to an embodiment of the present invention. Referring to FIG. 7, the controller includes a drive chip 20 and a plurality of clock signal lines 21; and one of the shift registers includes a clock signal inputting terminal 151; and one end of each of the clock signal lines 21 is electrically connected to the drive chip 20, and the other end of each of the clock signal lines 21 is electrically connected to the clock signal inputting terminal 151 of the shift register corresponding to the each of the clock signal lines 21; and the drive chip 20 is configured to successively provide, in the image displaying stage, clock signals to the shift registers 15 electrically connected with the scanning lines via the clock signal lines according to the arrangement sequence of the scanning lines.

Figure 8:
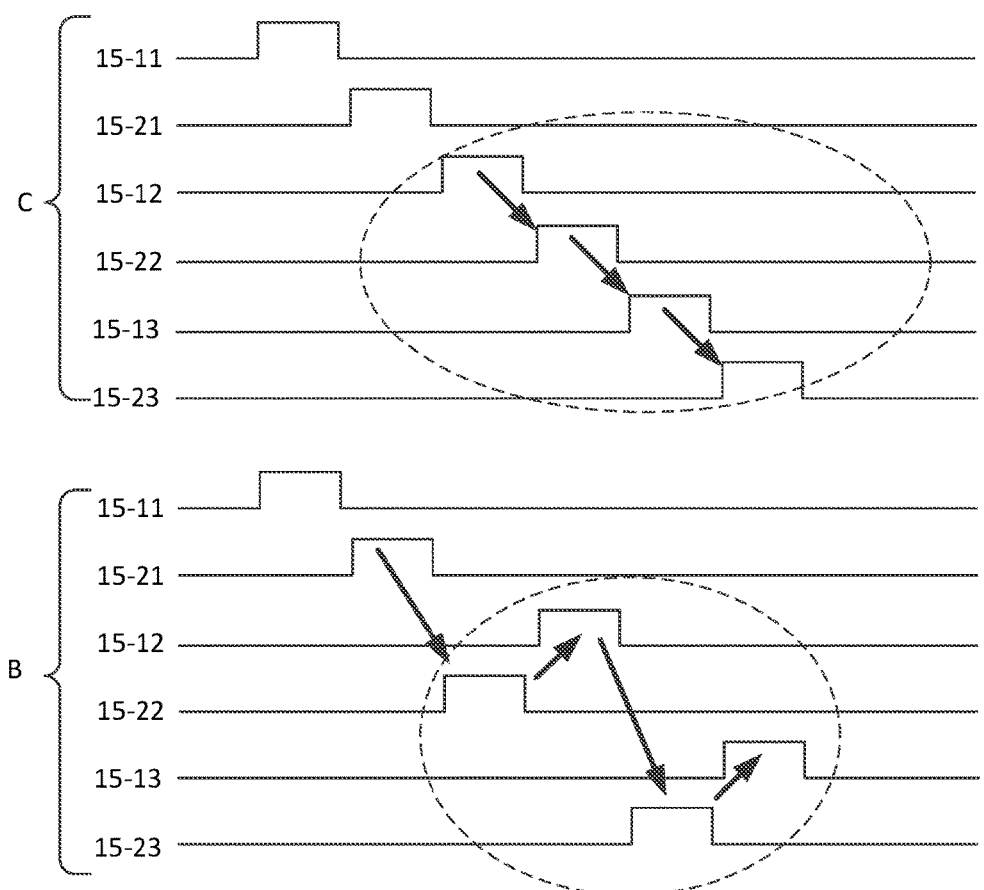
FIG. 8 is a timing graph showing clock signals of the array substrate provided in FIG. 5 and FIG. 7.

FIG. 8 is a timing graph showing clock signals of the array substrate according to FIG. 5 and FIG. 7; In FIG. 8, C is a timing graph showing clock signals of the array substrate as shown in FIG. 5, and B is a timing graph showing clock signals of the array substrate as shown in FIG. 7.

Comparing with the display panel, in the arrangement that the clock signals are successively provided to the shift registers 15 electrically connected with the scanning lines 14 via the clock signal lines according to the arrangement sequence of the scanning lines 14 according to this embodiment, the transmission sequence of the clock signals of the clock signal lines 21 electrically connected to the shift registers by the drive chip 20 is adjusted, so that the shift registers successively input the scanning signals to the scanning lines electrically connected to the shift registers according to the stage sequence of the stages of shift registers.

In one embodiment, pixel units can be charged in the normal order, and also the probability of misalignment between the signal outputting terminal of the shift register and the corresponding scanning line in the row direction is decreased, and the area of the non-display region of the display panel is decreased, and the complexity in the arrangement of the pressure sensors and the noise intensity of the pressure sensors are reduced, thereby increasing the detection accuracy of the pressure sensor.

Figure 9:
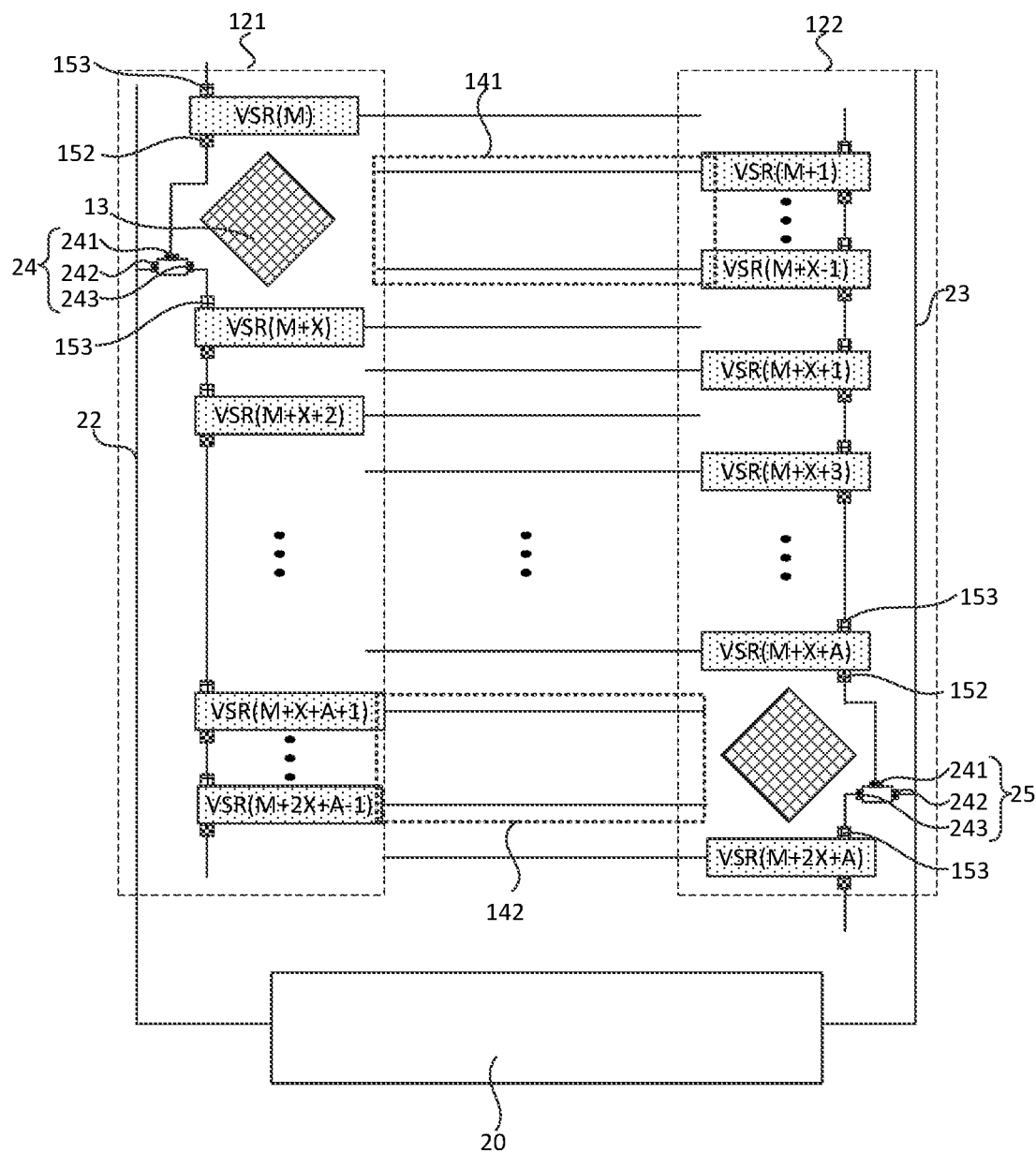
FIG. 9 is a structural diagram showing another array substrate according to an embodiment of the present invention.

FIG. 9 is a structural diagram showing another array substrate according to an embodiment of the present invention. Referring to FIG. 9, for this array substrate, the controller includes a drive chip 20, a first auxiliary trigger signal line 22, a second auxiliary trigger signal line 23, a first control switch 24 and a second control switch 25; and each of the first control switch 24 and the second control switch 25 includes a control terminal 241, a signal inputting terminal 242 and a signal outputting terminal 243; and each of the shift registers further includes a trigger signal outputting terminal 152 and a trigger signal inputting terminal 153. In the first region 121, the control terminal 241 of the first control switch 24 is electrically connected to the trigger signal outputting terminal 152 of the M-th stage of shift register VSR (M), and the signal inputting terminal 242 of the first control switch 24 is electrically connected to the first auxiliary trigger signal line 22, and the signal outputting terminal 243 of the first control switch 24 is electrically connected to the trigger signal inputting terminal 153 of the M−X-th stage of shift register VSR (M+X), In the second region 122, a control terminal 241 of the second control switch 25 is electrically connected to the trigger signal outputting terminal 152 of the M+X+A-th stage of shift register VSR(M+X+A), the signal inputting terminal 242 of the second control switch 25 is electrically connected to the second auxiliary trigger signal line 23, and the signal outputting terminal 243 of the second control switch 25 is electrically connected to the trigger signal inputting terminal 153 of the M+2X+A-th stage of shift register VSR (M+2X+A). The drive chip 20 is electrically connected to the first auxiliary trigger signal line 22 and the second auxiliary trigger signal line 23. The drive chip 20 is configured to input, in the image displaying stage, after inputting a trigger signal to the M+X−1-th stage of shift register VSR(M+X−1) disposed in the second region 122, a trigger signal to the M+X-th stage of shift register VSR (M+X) disposed in the first region 121 via the first auxiliary trigger signal line 22. The drive chip 20 is also configured to input, after inputting a trigger signal to the M+2X+A−1-th stage of shift register (M+2X+A−1) disposed in the first region 121, a trigger signal to M+2X+A-th stage of the shift register VSR (M+2X+A) disposed in the second region via the second auxiliary trigger signal line 23.

Specifically, still referring to FIG. 9, in the process that the M-th stage of shift register VSR (M) transmits a scanning signal to the corresponding scanning line, a trigger signal is generated and transmitted to the first control switch 24 via the trigger signal outputting terminal 152 thereof. The first control switch 24 is controlled to be turned on by the trigger signal outputted from the M-th stage of shift register VSR (M). After a trigger signal is inputted to the M+X−1-th stage of shift register VSR(M+X−1), the drive chip 20 inputs a trigger signal to the first auxiliary trigger signal line 22. Since the first control switch 24 is turned on, the trigger signal transmitted via the first auxiliary trigger signal line 22 passes the first control switch 24 and the trigger signal inputting terminal 153 of the M+X-th stage of shift register VSR (M+X) and enters into the M+X-th stage of shift register VSR (M+X), in order to trigger the M+X-th stage of shift register VSR (M+X) to output the scanning signal to the corresponding scanning line.

In the process that the M+X+A-th stage of shift register VSR (M+X+A) transmits a scanning signal to the corresponding scanning line, a trigger signal is generated and transmitted to the second control switch 25 via the trigger signal outputting terminal 152 thereof. The second control switch 25 is controlled to be turned on by the trigger signal outputted from the M+X+A-th stage of shift register VSR (M+X+A). After a trigger signal is inputted to the M+2X+A−1-th stage of shift register VSR(M+2X+A−1), the drive chip 20 inputs a trigger signal to the second auxiliary trigger signal line 23. Since the second control switch 25 is turned on, the trigger signal transmitted via the second auxiliary trigger signal line 23 passes the first control switch 25 and the trigger signal inputting terminal 153 of the M+2X+A-th stage of shift register VSR (M+2X+A) and enters into the M+2X+A-th stage of shift register VSR (M+2X+A), in order to trigger the M+2X+A-th stage of shift register VSR (M+2X+A) to output the scanning signal to the corresponding scanning line.

Comparing with the display panel provided in FIG. 2, only two auxiliary trigger signal lines (i.e., the first auxiliary trigger signal line 22 and the second auxiliary trigger signal line 23) are added in this arrangement, and the drive chip 20 inputs, in the image displaying stage, after inputting a trigger signal to the M+X−1-th stage of shift register VSR(M+X−1) disposed in the second region 122, a trigger signal to the M+X-th stage of shift register VSR (M+X) disposed in the first region 121 via the first auxiliary trigger signal line 22, and inputs, after inputting a trigger signal to the M+2X+A−1-th stage of shift register (M+2X+A−1) disposed in the first region 121, a trigger signal to M+2X+A-th stage of the shift register VSR(M+2X+A) disposed in the second region 122 via the second auxiliary trigger signal line 23. In this way, the pixel units can be charged in the normal order, and also the probability of misalignment between the signal outputting terminal of the shift register and the corresponding scanning line in the row direction is decreased, the area of the non-display region of the display panel is decreased, and the complexity in the arrangement of the pressure sensors and the noise intensity of the pressure sensors are reduced, thereby increasing the detection accuracy of the pressure sensor.

In above embodiments, the first control switch 24 and the second control switch 25 have various structures. In an embodiment, the first control switch 24 and the second control switch 25 may be a thin film transistor (TFT).

Figure 10:
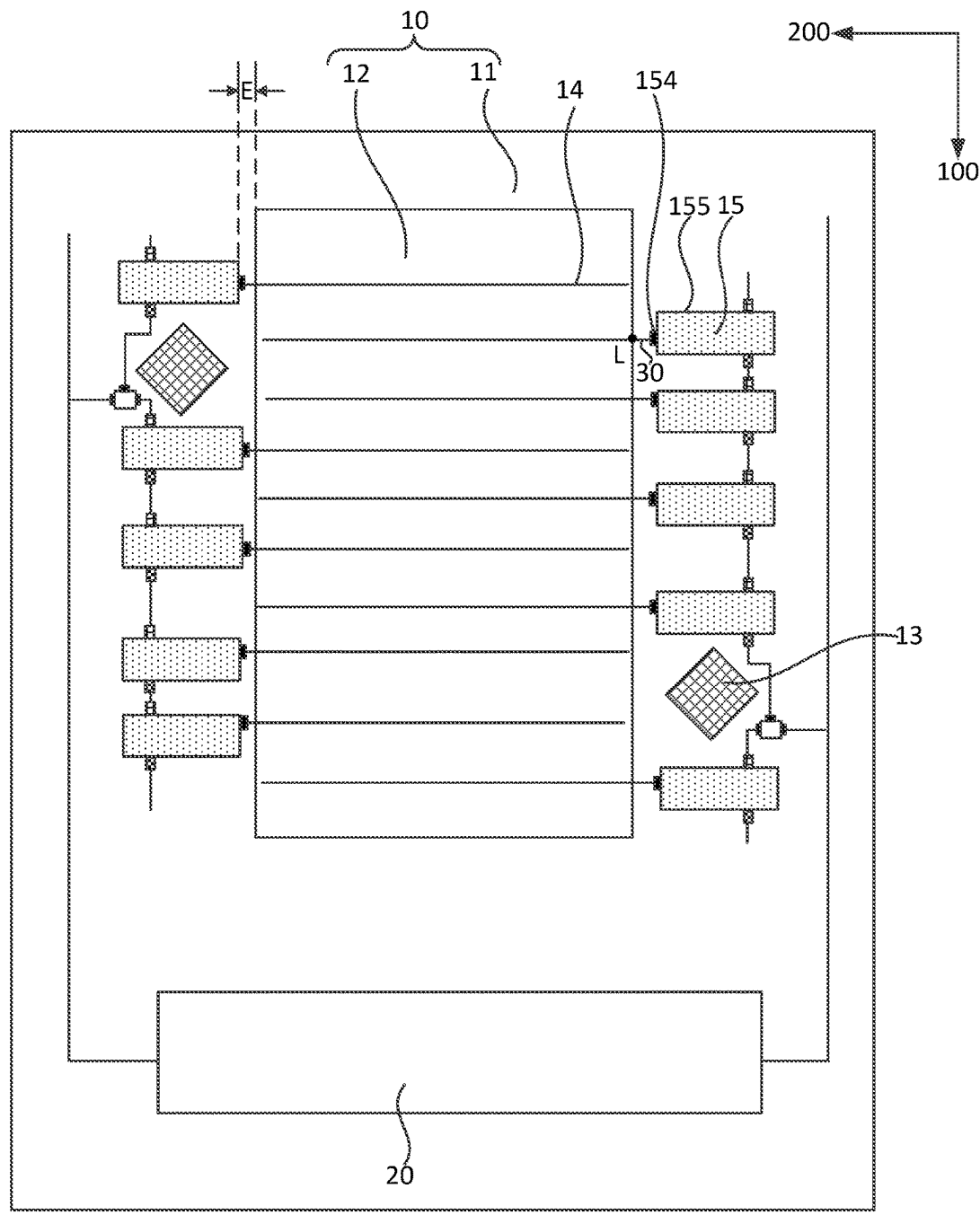
FIG. 10 is a structural diagram showing another array substrate according to an embodiment of the present invention.

FIG. 10 is a structural diagram showing another array substrate according to an embodiment of the present invention. Referring to FIG. 10, each of the plurality of shift registers 15 includes a scan signal outputting terminal 154, and each of the scanning lines 14 is electrically connected to the scan signal outputting terminal 154 of the shift register 15 corresponding to the scanning line; and each of the scanning lines 14 is electrically connected with the scan signal outputting terminal 154 without being bended.

For the arrangement that of "each of the scanning lines 14 is electrically connected with the scan signal outputting terminal 154 without being bended", specifically, the position of the scan signal outputting terminal 154 relative to a side 155 of the shift register 15 is adjusted, so that each of the scanning lines 14 can be electrically connected with the scan signal outputting terminal 154 without being bended. In one embodiment, the connecting wire 30 between one end L of the scanning line 14 and the scan signal outputting terminal 154 may not include the line segment parallel to the first direction 100. In such the arrangement, the pixel units can be charged in the normal order, and also the probability of misalignment between the signal outputting terminal of the shift register and the corresponding scanning line 14 in the row direction is decreased, the area of the non-display region of the display panel is decreased, and the complexity in the arrangement of the pressure sensors 13 and the noise intensity of the pressure sensors 13 are reduced, thereby increasing the detection accuracy of the pressure sensor 13.

In above embodiments, the arrangements of the pressure sensor may be various. The exemplified embodiments are given in detail as follows, but are not intended to limit the present disclosure.

Figure 11:
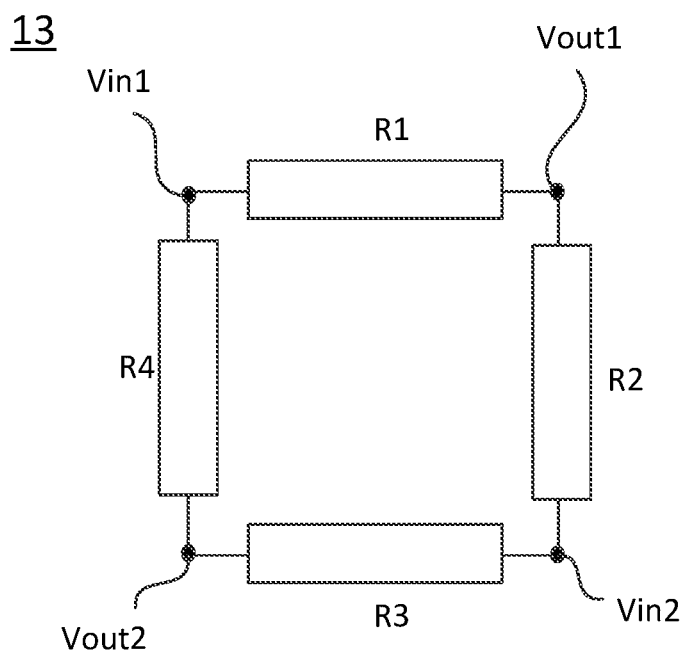
FIG. 11 is a structural diagram showing a pressure sensor according to an embodiment of the present invention.

FIG. 11 is a structural diagram for a pressure sensor provided by the embodiments of the present invention. Referring to FIG. 11, the pressure sensor 13 further includes a first resistor R1, a second resistor R2, a third resistor R3, a fourth resistor R4, a power inputting terminal Vin1, a second power inputting terminal Vin2, a first induction signal measuring terminal Vout1 and a second induction signal measuring terminal Vout2. A first end of the first resistor R1 and a first end of the fourth resistor R4 are electrically connected to the first power inputting terminal Vin1, and a second end of the first resistor R1 and a first end of the second resistor R2 are electrically connected to the first induction signal measuring terminal Vout1, and a second end of the fourth resistor R4 and a first end of the third resistor R3 are electrically connected to the second induction signal measuring terminal Vout2, and a second end of the second resistor R2 and a second end of the third resistor R3 are electrically connected to second power inputting terminal Vin2; the first power inputting terminal Vin1 and the second power inputting terminal Vin2 are configured to provide a bias voltage signal to the pressure sensor13; and the first induction signal measuring terminal Vout1 and the second induction signal measuring terminal Vout2 are configured to output a pressure detection signal from the pressure sensor 13.

Still referring to FIG. 11, a Wheatstone bridge is formed by the first resistor R1, the second resistor R2, the third resistor R3 and the fourth resistor R4. When the bias voltage signal is applied to the first power signal inputting terminal Vin1 and the second power signal inputting terminal Vin2, current flows through each of the branches of the Wheatstone bridge. At this moment, when the display panel with the array substrate is applied with a pressure, a shearing force from the corresponding position on the display panel is sensed, and the resistance of each of the internal resistors (including the first resistor R1, the second resistor R2, the third resistor R3 and the fourth resistor R4) of the pressure sensor is changed, so that the absolute value of the difference between the electric signals (namely pressure detection signals) respectively outputted from the first induction signal measuring terminal Vout1 and the second induction signal measuring terminal Vout2 of the pressure sensor 13 is different from the absolute value of the difference between the electric signals respectively outputted from the first induction signal measuring terminal Vout1 and the second induction signal measuring terminal Vout2 without the applied pressure. Therefore, the magnitude of the touch pressure may be determined.

Based on above contents, in an embodiment, when a pressure is not applied, the resistance ratio of the first resistor R1 to the second resistor R2 is equal to that of the third resistor R3 to the fourth resistor R4. In one embodiment, when a bias voltage signal is applied on the pressure sensor 13 and the resistances of the first resistor R1, the second resistor R2, the third resistor R3 and the fourth resistor R4 are satisfied with above relationship, the divided voltage of the first resistor R1 is equal to that of the fourth resistor R4 and the divided voltage of the second resistor R2 is equal to that of the third resistor R3. When there is no pressing operation, the potential of the first induction signal measuring terminal Vout1 is equal to that of the second induction signal measuring terminal Vout2 of the pressure sensor, and pressure detection signals respectively outputted from the first induction signal measuring terminal Vout1 and the second induction signal measuring terminal Vout2 of the pressure sensor are zero. The pressure detection signal outputted by the pressure sensor 13 when there is a pressing operation is equal to the variation of the pressure detection signal outputted by the pressure sensor 13 in a comparison of the state of post-pressing operation with the state of pre-pressing operation. In one embodiment, the calculating process of the touch pressure value and reduce the response time of the corresponding operations performed by the display panel according to the magnitude of the touch pressure.

Figure 12:
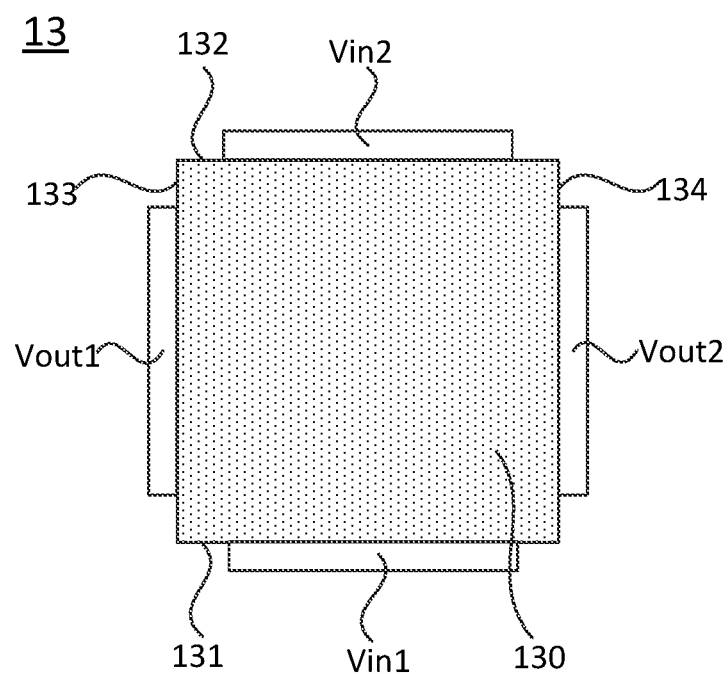
FIG. 12 is a structural diagram for another pressure sensor according to an embodiment of the present invention.

FIG. 12 is a structural diagram for another pressure sensor according to an embodiment of the present invention one of the pressure sensors 13 further includes: a main body 130, a first power inputting terminal Vin1, a second power inputting terminal Vin2, a first induction signal measuring terminal Vout1 and a second induction signal measuring terminal Vout2; and the main body 130 of the pressure sensor 13 is made of semiconductor material; and the main body 130 of the pressure sensor 13 includes a polygon structure with at least four edges, and a first edge 131 and a second edge 132 of the at least four edges are disconnected with each other, and a third edge 133 and a fourth edge 134 of the at least four edges are disconnected with each other, and the first power inputting terminal Vin1 is disposed at the first edge 131 and the second power inputting terminal Vin2 is disposed at the second edge 132, the first power inputting terminal Vin1 and the second power inputting terminal Vin2 are configured to provide a bias voltage signal to the pressure sensor 13; and the first induction signal measuring terminal Vout1 is disposed at the third edge 133 and the second induction signal measuring terminal Vout2 is disposed at the fourth edge 134, and the first induction signal measuring terminal and the second induction signal measuring terminal Vout2 are configured to output a pressure detection signal from the pressure sensor 13.

Figure 13:
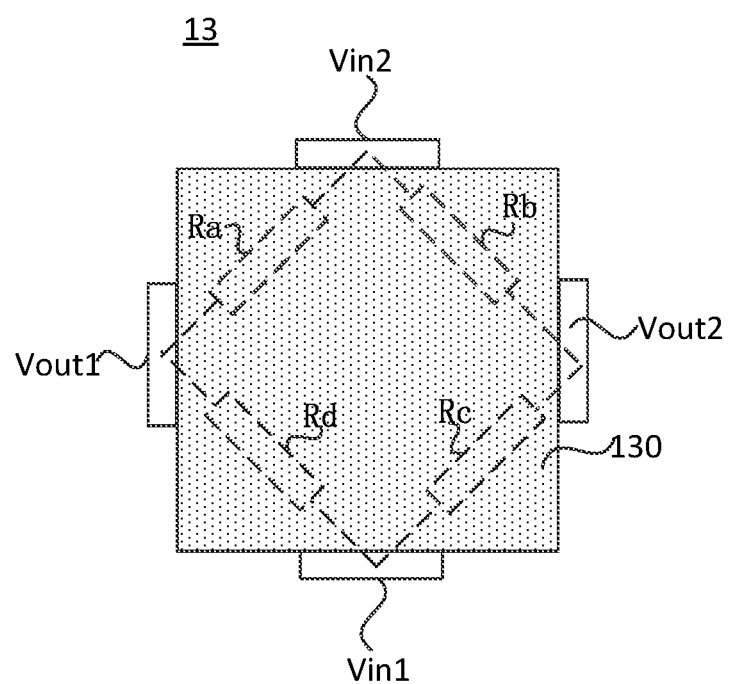
FIG. 13 is an equivalent schematic diagram of the pressure sensor shown in FIG. 12.

FIG. 13 is an equivalent schematic diagram for the pressure sensor in FIG. 12. Referring to FIG. 12 and FIG.

13, the pressure sensor 13 may be equivalent to a Wheatstone bridge, the Wheatstone bridge includes four equivalent resistors, namely the equivalent resistor Ra, the equivalent resistor Rb, the equivalent resistor Rc and the equivalent resistor Rd respectively, and the equivalent resistor Ra is located between the second power signal inputting terminal Vin2 and the first induction signal measuring terminal Vout1, the equivalent resistor Rb is located between the second power signal inputting terminal Vin2 and the second induction signal measuring terminal Vout2, the equivalent resistor Rd is located between the first power signal inputting terminal Vin1 and the first induction signal measuring terminal Vout1, the equivalent resistor Rc is located between the first power signal inputting terminal Vin1 and the second induction signal measuring terminal Vout2. When a bias voltage signal is applied to the first power signal inputting terminal Vin1 and the second power signal inputting terminal Vin2, a current flows through each branch of the Wheatstone bridge. At this time, when the display panel is applied by a pressure, at least one of the internal equivalent resistor Ra, the equivalent resistor Rb, the equivalent resistor Rc and the equivalent resistor Rd changes in resistance, since the pressure sensor 13 is affected by the shearing force from the position corresponding to the pressure sensor 13 in the display panel, so that the difference between the pressure-sensitive detection signals outputted from the first induction signal measuring terminal Vout1 and the second induction signal measuring terminal Vout2 of the pressure sensor 13 is different from the difference between the pressure-sensitive detection signals outputted from the first induction signal measuring terminal Vout1 and the second induction signal measuring terminal Vout2 without the applied pressure. Therefore, the magnitude of the touch pressure may be determined.

In an embodiment, the shape of the main body of the pressure sensor 130 may be a square. In one embodiment, the resistance of each of the equivalent resistor Ra, the equivalent resistor Rb, the equivalent resistor Rc and the equivalent resistor Rd is equal with each other. As such, when there is no pressing operation, the potential of the first induction signal measuring terminal Vout1 is equal to that of the second induction signal measuring terminal Vout2 of the pressure sensor, and pressure detection signals respectively outputted from the first induction signal measuring terminal Vout1 and the second induction signal measuring terminal Vout2 of the pressure sensor are zero. In one embodiment, the calculating process of the touch pressure value and reduce the response time of the corresponding operations performed by the display panel according to the magnitude of the touch pressure.

Figure 14:
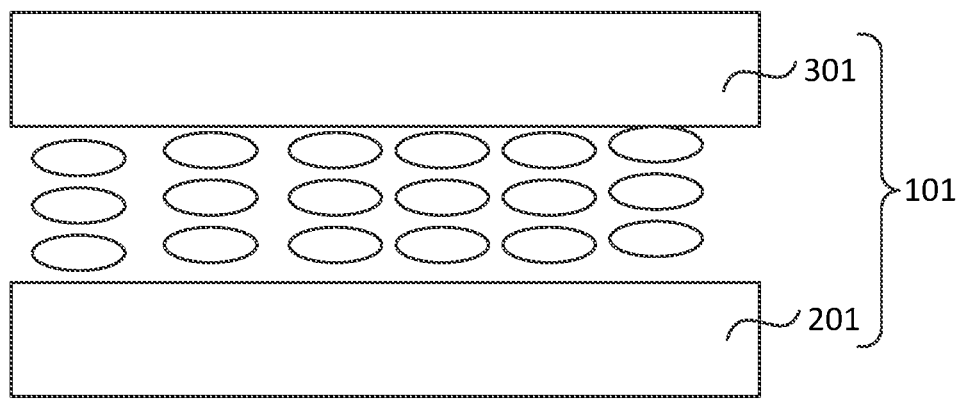
FIG. 14 is a structural diagram showing a display panel according to an embodiment of the present invention.

The present disclosure further provides a display panel. FIG. 14 is a structural diagram showing a display panel according to an embodiment of the present invention. Referring to FIG. 14, the display panel 101 includes any one of array substrates 201 provided by the present disclosure. In an embodiment, the display panel further includes an opposed display panel 301 opposite to the display panel 201.

For the display panel provided in the present disclosure, the pixel units can be charged in the normal order, and also the probability of misalignment between the signal outputting terminal of the shift register and the corresponding scanning line in the row direction is decreased, the area of the non-display region of the display panel is decreased, and the complexity in the arrangement of the pressure sensors and the noise intensity of the pressure sensors are reduced, thereby increasing the detection accuracy of the pressure sensor.

The present disclosure further provides a driving device. The array substrate includes: a base substrate, and the base substrate includes a display region and a non-display region surrounding the display region, and the non-display region includes a first region located at a first side of the display region and a second region located at a second side of the display region;

a plurality of shift registers successively disposed in the first region and the second region along a first direction, and stages of shift registers from the plurality of shift registers disposed at each of the first side and the second side of the display region are successively cascaded with each other; and a plurality of scanning lines disposed in the display region of the base substrate, and each of the plurality of shift registers is electrically connected to a respective one of the plurality of scanning lines to output a scanning signal, and the first direction is intersected with the plurality of scanning lines; and a plurality of pressure sensors disposed in the first region and the second region of the base substrate, and one of the plurality of pressure sensors is disposed between adjacent two of the shift registers at either of the two sides of the display region; the scanning lines include a first set of scanning lines and a second set of scanning lines; the extending lines of the first set of scanning lines pass the pressure sensors in the first region, and the first set of scanning lines are electrically connected to the corresponding shift registers in the second region; the extending lines of the second set of scanning lines pass the pressure sensors in the second region, and the second set of scanning lines are electrically connected to the corresponding shift registers in the first region; and a controller, which is electrically connected to each of the plurality of shift registers, the controller is configured to control the shift registers to input the scanning signals to the scanning lines electrically connected with the shift registers according to an arrangement sequence of the scanning lines in an image displaying stage.

The driving device includes:

in an image displaying stage, each of the shift registers is to be controlled to input the scanning signals to the scanning lines electrically connected with the shift registers according to an arrangement sequence of the scanning lines; and the scanning signals transmitted in the first set of scanning lines are provided by the shift registers in the second region corresponding to the first set of scanning lines; and the scanning signals transmitted in the second set of scanning lines are provided by the shift registers in the first region corresponding to the second set of scanning lines.

Exemplarily, referring to the timing graph B of the clock signal in FIG. 7 and FIG. 8, in above driving device, "in an image displaying stage, the controller is configured to control the shift registers to input the scanning signals to the scanning lines electrically connected with the shift registers according to an arrangement sequence of the scanning lines", which refers to that, in the image displaying stage, the scanning signals are successively inputted to the scanning lines 14 electrically connected with the shift registers according to the orders as follows: the shift register 15-11 (namely the first stage of the shift register VSR1), the shift register 15-21 (namely the second stage of the shift register VSR2), the shift register 15-22 (namely the third stage of the shift register VSR3), the shift register 15-12 (namely the fourth stage of the shift register VSR4), the shift register 15-23 (namely the fourth stage of the shift register VSRS), the shift register 15-13 (namely the sixth stage of the shift register VSR6),the shift register 15-24 (namely the seventh stage of the shift register VSR7),the shift register 15-14 (namely the eighth stage of the shift register VSR8),the shift register 15-15 (namely the ninth stage of the shift register VSR9),the shift register 15-23 (namely the tenth stage of the shift register VSR10).

For the driving device provided by the present disclosure, the pixel units can be charged in the normal order, and also the probability of misalignment between the signal outputting terminal of the shift register and the corresponding scanning line in the row direction is decreased, the area of the non-display region of the display panel is decreased, and the complexity in the arrangement of the pressure sensors and the noise intensity of the pressure sensors are reduced, thereby increasing the detection accuracy of the pressure sensor.

Further, the controller includes a drive chip, a first auxiliary trigger signal line, a second auxiliary trigger signal line, a first control switch and a second control switch; and each of the first control switch and the second control switch includes a control terminal, a signal inputting terminal and a signal outputting terminal;

each of the shift registers further includes a trigger signal outputting terminal and a trigger signal inputting terminal; and the stage number of each of the stages of shift registers is same with the arrangement sequence number of the scanning line electrically connected to the each stage of the shift register;

two shift registers respectively adjacent with one of the pressure sensors in the first region are a M-th stage of shift register and a M+X-th stage of shift register, respectively, and the amount of the first set of scanning lines corresponding to the one of the pressure sensors is X−1; and two shift registers respectively adjacent with one of the pressure sensors in the second region are a M+X+A-th stage of shift register and a M+2X+A-th stage of shift register, respectively, and the amount of the second set of scanning lines corresponding to the one of the pressure sensors is X−1;

and X is a positive integer not less than two, and M and A are a positive integer not less than one; and in the first region, the control terminal of the first control switch is electrically connected to the trigger signal outputting terminal of the M-th stage of shift register, and the signal inputting terminal of the first control switch is electrically connected to the first auxiliary trigger signal line, and the signal outputting terminal of the first control switch is electrically connected to the trigger signal inputting terminal of the M+X-th stage of shift register; and in the second region, a control terminal of the second control switch is electrically connected to the trigger signal outputting terminal of the M+X+A-th stage of shift register, and the signal inputting terminal of the second control switch is electrically connected to the second auxiliary trigger signal line, and the signal outputting terminal of the second control switch is electrically connected to the trigger signal inputting terminal of the M+2X+A-th stage of shift register; and the drive chip is electrically connected to the first auxiliary trigger signal line and the second auxiliary trigger signal line, and the drive chip is configured to input, in the image displaying stage, after inputting a trigger signal to the M+X−1-th stage of shift register within the second region, a trigger signal to the M+X-th stage of shift register within the first region via the first auxiliary trigger signal line, and input, after inputting a trigger signal to the M+2X+A−1-th stage of shift register within the first region, a trigger signal to M+2X+A-th stage of the shift register within the second region via the second auxiliary trigger signal line;

and the step of controlling the plurality of shift registers to input scanning signals to the scanning lines electrically connected with the shift registers according to the arrangement sequence of the scanning lines includes:

inputting, after inputting a trigger signal to the M+X−1-th stage of shift register within the second region, a trigger signal to the M+X-th stage of shift register within the first region via the first auxiliary trigger signal line, and inputting, after inputting a trigger signal to the M+2X+A−1-th stage of shift register within the first region, a trigger signal to M+2X+A-th stage of shift register within the second region via the second auxiliary trigger signal line, so that the plurality of shift registers input the scanning signals to the scanning lines electrically connected with the shift registers according to the arrangement sequence of the stages of shift registers.

What is claimed is:

1. An array substrate, comprising:
    a base substrate, wherein the base substrate comprises a display region and a non-display region surrounding the display region, and wherein the non-display region comprises a first region located at a first side of the display region and a second region located at a second side of the display region, and the first side is opposite to the second side;
    a plurality of shift registers successively disposed in the first region and the second region along a first direction, wherein stages of shift registers from the plurality of shift registers disposed at each of the first region and the second region are successively cascaded with each other;
    a plurality of scanning lines disposed in the display region of the base substrate, wherein each of the plurality of shift registers is electrically connected to a respective one of the plurality of scanning lines to output a scanning signal, and the first direction is intersected with the plurality of scanning lines;
    a plurality of pressure sensors disposed in the first region and the second region, wherein one of the plurality of pressure sensors is disposed between adjacent two of the shift registers at either of the first side and the second side of the display region; the scanning lines comprise a first set of scanning lines and a second set of scanning lines; the extending lines of the first set of scanning lines pass the pressure sensors in the first region, and the first set of scanning lines are electrically connected to the corresponding shift registers in the second region; the extending lines of the second set of scanning lines pass the pressure sensors in the second region, and the second set of scanning lines are electrically connected to the corresponding shift registers in the first region; and
    a controller, which is electrically connected to each of the plurality of shift registers, wherein the controller is configured to control the shift registers to input the scanning signals to the scanning lines electrically connected to the shift registers according to an arrangement sequence of the scanning lines in an image displaying stage.

2. The array substrate according to claim 1, wherein
    a stage number of each of the stages of shift registers is same with a sequence number of the scanning line electrically connected to the each stage of the shift register; and two shift registers respectively adjacent with one of the pressure sensors in the first region are a M-th stage of shift register and a M+X-th stage of shift register, respectively, and the amount of the first set of scanning lines corresponding to the one of the pressure sensors is X−1;

two shift registers respectively adjacent with one of the pressure sensors in the second region are a M+X+A-th stage of shift register and a M+2X+A-th stage of shift register, respectively, and the amount of the second set of scanning lines corresponding to the one of the pressure sensors is X−1;

wherein X is a positive integer not less than two, and M and A are a positive integer not less than one.

3. The array substrate according to claim 2, wherein
the controller comprises a drive chip, a first auxiliary trigger signal line, a second auxiliary trigger signal line, a first control switch and a second control switch; and
each of the first control switch and the second control switch comprises a control terminal, a signal inputting terminal and a signal outputting terminal;
wherein each of the shift registers further comprises a trigger signal outputting terminal and a trigger signal inputting terminal; and
in the first region, the control terminal of the first control switch is electrically connected to the trigger signal outputting terminal of the M-th stage of shift register, and the signal inputting terminal of the first control switch is electrically connected to the first auxiliary trigger signal line, and the signal outputting terminal of the first control switch is electrically connected to the trigger signal inputting terminal of the M+X-th stage of shift register; and
in the second region, a control terminal of the second control switch is electrically connected to the trigger signal outputting terminal of the M+X+A-th stage of shift register, and the signal inputting terminal of the second control switch is electrically connected to the second auxiliary trigger signal line, and the signal outputting terminal of the second control switch is electrically connected to the trigger signal inputting terminal of the M+2X+A-th stage of shift register;
wherein the drive chip is electrically connected to the first auxiliary trigger signal line and the second auxiliary trigger signal line, and
the drive chip is configured to input, in the image displaying stage, after inputting a trigger signal to the M+X−1-th stage of shift register within the second region, a trigger signal to the M+X-th stage of shift register within the first region via the first auxiliary trigger signal line, and input, after inputting a trigger signal to the M+2X+A−1-th stage of shift register within the first region, a trigger signal to M+2X+A-th stage of shift register within the second region via the second auxiliary trigger signal line.

4. The array substrate according to claim 1, wherein
the controller comprises a drive chip and a plurality of clock signal lines;
wherein each of the shift registers comprises a clock signal inputting terminal; and
one end of each of the clock signal lines is electrically connected to the drive chip, and the other end of each of the clock signal lines is electrically connected to the clock signal inputting terminal of the shift register corresponding to the each of the clock signal lines; and
the drive chip is configured to successively provide, in the image displaying stage, clock signals to the shift registers electrically connected with the scanning lines via the clock signal lines according to the arrangement sequence of the scanning lines.

5. The array substrate according to claim 1, wherein
each of the plurality of shift registers comprises a scan signal outputting terminal, and each of the scanning lines is electrically connected to the scan signal outputting terminal of the shift register corresponding to the scanning line; and
each of the scanning lines is electrically connected with the corresponding scan signal outputting terminal without being bended.

6. The array substrate according to claim 1, wherein
each of the pressure sensors further comprises a first resistor, a second resistor, a third resistor, a fourth resistor, a first power inputting terminal, a second power inputting terminal, a first induction signal measuring terminal and a second induction signal measuring terminal;
a first end of the first resistor and a first end of the fourth resistor are electrically connected to the first power signal inputting terminal, a second end of the first resistor and a first end of the second resistor are electrically connected to the first induction signal measuring terminal, a second end of the fourth resistor and a first end of third resistor are electrically connected to the second induction signal measuring terminal, a second end of the second resistor and a second end of the third resistor are electrically connected to the second power signal inputting terminal; and
the first power inputting terminal and the second power inputting terminal are configured to provide a bias voltage signal to the pressure sensor; the first induction signal measuring terminal and the second induction signal measuring terminal are configured to output a pressure detection signal from the pressure sensor.

7. The array substrate according to claim 1, wherein
each of the pressure sensors further comprises: a main body, a first power inputting terminal, a second power inputting terminal, a first induction signal measuring terminal and a second induction signal measuring terminal; and
a main body of the pressure sensor is made of semiconductor material; and the main body of the pressure sensor comprises a polygon structure with at least four edges, wherein a first edge and a second edge of the at least four edges are disconnected with each other, and a third edge and a fourth edge of the at least four edges are disconnected with each other,
wherein the first power inputting terminal is disposed at the first edge and the second power inputting terminal is disposed at the second edge, the first power inputting terminal and the second power inputting terminal are configured to provide a bias voltage signal to the pressure sensor; and the first induction signal measuring terminal is disposed at the third edge and the second induction signal measuring terminal is disposed at the fourth edge, and the first induction signal measuring terminal and the second induction signal measuring terminal are configured to output a pressure detection signal from the pressure sensor.

8. A display panel, comprising an array substrate, wherein the array substrate comprises:
a base substrate, wherein the base substrate comprises a display region and a non-display region surrounding the display region, and wherein the non-display region comprises a first region located at a first side of the display region and a second region located at a second side of the display region, and the first side is opposite to the second side;

a plurality of shift registers successively disposed in the first region and the second region along a first direction, wherein stages of shift registers from the plurality of shift registers disposed at each of the first region and the second region of the display region are successively cascaded with each other;

a plurality of scanning lines disposed in the display region of the base substrate, wherein each of the plurality of shift registers is electrically connected to a respective one of the plurality of scanning lines to output a scanning signal, and the first direction is intersected with the plurality of scanning lines;

a plurality of pressure sensors disposed in the first region and the second region of the base substrate, wherein one of the plurality of pressure sensors is disposed between adjacent two of the shift registers at either of the first side and the second side of the display region; the scanning lines comprise a first set of scanning lines and a second set of scanning lines; the extending lines of the first set of scanning lines pass the pressure sensors in the first region, and the first set of scanning lines are electrically connected to the corresponding shift registers in the second region; the extending lines of the second set of scanning lines pass the pressure sensors in the second region, and the second set of scanning lines are electrically connected to the corresponding shift registers in the first region; and a controller, which is electrically connected to each of the plurality of shift registers, wherein the controller is configured to control the shift registers to input the scanning signals to the scanning lines electrically connected with to the shift registers according to an arrangement sequence of the scanning lines in an image displaying stage; and the driving method comprises:

controlling, in the image displaying stage, the plurality of shift registers to input scanning signals to the scanning lines electrically connected with the shift registers according to the arrangement sequence of the scanning lines;

wherein the scanning signals transmitted in the first set of scanning lines are provided by the shift registers in the second region corresponding to the first set of scanning lines; and the scanning signals transmitted in the second set of scanning lines are provided by the shift registers in the first region corresponding to the second set of scanning lines.

9. A driving device, comprising an array substrate, wherein the array substrate comprises:

a base substrate, wherein the base substrate comprises a display region and a non-display region surrounding the display region, and wherein the non-display region comprises a first region located at a first side of the display region and a second region located at a second side of the display region, and the first side is opposite to the second side ;

a plurality of shift registers successively disposed in the first region and the second region along a first direction, wherein stages of shift registers from the plurality of shift registers disposed at each of the first region and the second region of the display region are successively cascaded with each other;

a plurality of scanning lines disposed in the display region of the base substrate, wherein each of the plurality of shift registers is electrically connected to a respective one of the plurality of scanning lines to output a scanning signal, and the first direction is intersected with the plurality of scanning lines;

a plurality of pressure sensors disposed in the first region and the second region of the base substrate, wherein one of the plurality of pressure sensors is disposed between adjacent two of the shift registers at either of the first side and the second side of the display region; the scanning lines comprise a first set of scanning lines and a second set of scanning lines; the extending lines of the first set of scanning lines pass the pressure sensors in the first region, and the first set of scanning lines are electrically connected to the corresponding shift registers in the second region; the extending lines of the second set of scanning lines pass the pressure sensors in the second region, and the second set of scanning lines are electrically connected to the corresponding shift registers in the first region; and a controller, which is electrically connected to each of the plurality of shift registers, wherein the controller is configured to control the shift registers to input the scanning signals to the scanning lines electrically connected with to the shift registers according to an arrangement sequence of the scanning lines in an image displaying stage; and the driving device further comprises:

controlling, in the image displaying stage, the plurality of shift registers to input scanning signals to the scanning lines electrically connected with the shift registers according to the arrangement sequence of the scanning lines;

wherein the scanning signals transmitted in the first set of scanning lines are provided by the shift registers in the second region corresponding to the first set of scanning lines; and the scanning signals transmitted in the second set of scanning lines are provided by the shift registers in the first region corresponding to the second set of scanning lines.

10. The driving device according to claim 9, wherein the controller comprises a drive chip, a first auxiliary trigger signal line, a second auxiliary trigger signal line, a first control switch and a second control switch; and each of the first control switch and the second control switch comprises a control terminal, a signal inputting terminal and a signal outputting terminal;

each of the shift registers further comprises a trigger signal outputting terminal and a trigger signal inputting terminal; and the stage number of each of the stages of shift registers is same with the arrangement sequence number of the scanning line electrically connected to the each stage of the shift register;

two shift registers respectively adjacent with one of the pressure sensors in the first region are a M-th stage of shift register and a M+X-th stage of shift register, respectively, and the amount of the first set of scanning lines corresponding to the one of the pressure sensors is X−1; and two shift registers respectively adjacent with one of the pressure sensors in the second region are a M+X+A-th stage of shift register and a M+2X+A-th stage of shift register, respectively, and the amount of the second set of scanning lines corresponding to the one of the pressure sensors is X−1;

wherein X is a positive integer not less than two, and M and A are a positive integer not less than one; and in the first region, the control terminal of the first control switch is electrically connected to the trigger signal outputting terminal of the M-th stage of shift register, and the signal inputting terminal of the first control switch is electrically connected to the first auxiliary trigger signal line, and the signal outputting terminal of the first control switch is electrically connected to the trigger signal inputting terminal of the M+X-th stage of shift register; and in the second region, a control terminal of the second control switch is electrically connected to the trigger signal outputting terminal of the M+X+A-th stage of shift register, and the signal inputting terminal of the second control switch is electrically connected to the second auxiliary trigger signal line, and the signal outputting terminal of the second control switch is electrically connected to the trigger signal inputting terminal of the M+2X+A-th stage of shift register;

wherein the drive chip is electrically connected to the first auxiliary trigger signal line and the second auxiliary trigger signal line, and the drive chip is configured to input, in the image displaying stage, after inputting a trigger signal to the M+X−1-th stage of shift register within the second region, a trigger signal to the M+X-th stage of shift register within the first region via the first auxiliary trigger signal line, and input, after inputting a trigger signal to the M+2X+A−1-th stage of shift register within the first region, a trigger signal to M+2X+A-th stage of the shift register within the second region via the second auxiliary trigger signal line;

wherein the step of controlling the plurality of shift registers to input scanning signals to the scanning lines electrically connected with the shift registers according to the arrangement sequence of the scanning lines comprises:

inputting, after inputting a trigger signal to the M+X−1-th stage of shift register within the second region, a trigger signal to the M+X-th stage of shift register within the first region via the first auxiliary trigger signal line, and inputting, after inputting a trigger signal to the M+2X+A−1-th stage of shift register within the first region, a trigger signal to M+2X+A-th stage of shift register within the second region via the second auxiliary trigger signal line, so that the plurality of shift registers input the scanning signals to the scanning lines electrically connected with the shift registers according to the arrangement sequence of the stages of shift registers.

\* \* \* \* \*